United States Patent [19]
Lomastro

[11] Patent Number: 5,292,057
[45] Date of Patent: Mar. 8, 1994

[54] FIXTURE FOR, AND METHOD OF, WELDING GROUNDING CONNECTOR TO STRUCTURAL STEEL MEMBER

[75] Inventor: Joseph A. Lomastro, Pawtucket, R.I.

[73] Assignee: Burndy Corporation, Norwalk, Conn.

[21] Appl. No.: 16,265

[22] Filed: Feb. 11, 1993

[51] Int. Cl.⁵ .................................................. B23K 23/00
[52] U.S. Cl. ..................................... 228/198; 228/4.1; 228/234.3
[58] Field of Search ......................... 228/241, 198, 4.1

[56] References Cited

U.S. PATENT DOCUMENTS

| | | | |
|---|---|---|---|
| 802,967 | 10/1905 | Brown | 228/241 X |
| 878,868 | 2/1908 | Cole | 164/54 |
| 878,869 | 2/1908 | Cole | 164/54 |
| 1,007,005 | 10/1911 | Lukaszewske | 164/54 X |
| 2,225,028 | 12/1940 | Banks | 44/3 |
| 2,318,604 | 5/1943 | Febrey | 228/241 |
| 2,383,008 | 8/1945 | Meister | 269/8 |
| 2,482,093 | 9/1949 | Carlson | 228/241 X |
| 2,991,347 | 7/1961 | Weinstein | 219/85 R |
| 3,262,163 | 7/1966 | Gelfand | 228/241 |
| 4,114,262 | 9/1978 | Franck | 29/628 |
| 4,729,503 | 3/1988 | Niinivaara | 228/241 X |
| 4,822,289 | 4/1989 | DeLeo | 439/92 |
| 4,887,970 | 12/1989 | den Hartog | 439/92 |

Primary Examiner—Kenneth J. Ramsey
Attorney, Agent, or Firm—Hoffman, Wasson & Gitler

[57] ABSTRACT

A fixture for welding a grounding connector to a structural steel member is disclosed. Such fixture is formed of a magnetic material so that the fixture is attracted to, and retained upon, the steel member. A chamber is defined within the rectangular body of the fixture, and an inlet passage in the front of the fixture receives one end of the grounding connector. Thermite powder is introduced into the chamber, and an igniter cap delivers a spark to the powder, to ignite same, thereby producing a molten mass of metal. The metal flows the fixture and bonds the grounding connector and the fixture to the structural steel member. The method of utilizing such single-use fixture is also disclosed.

5 Claims, 3 Drawing Sheets

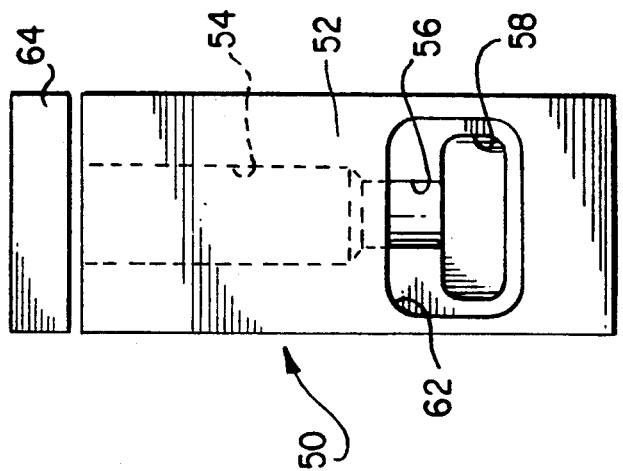
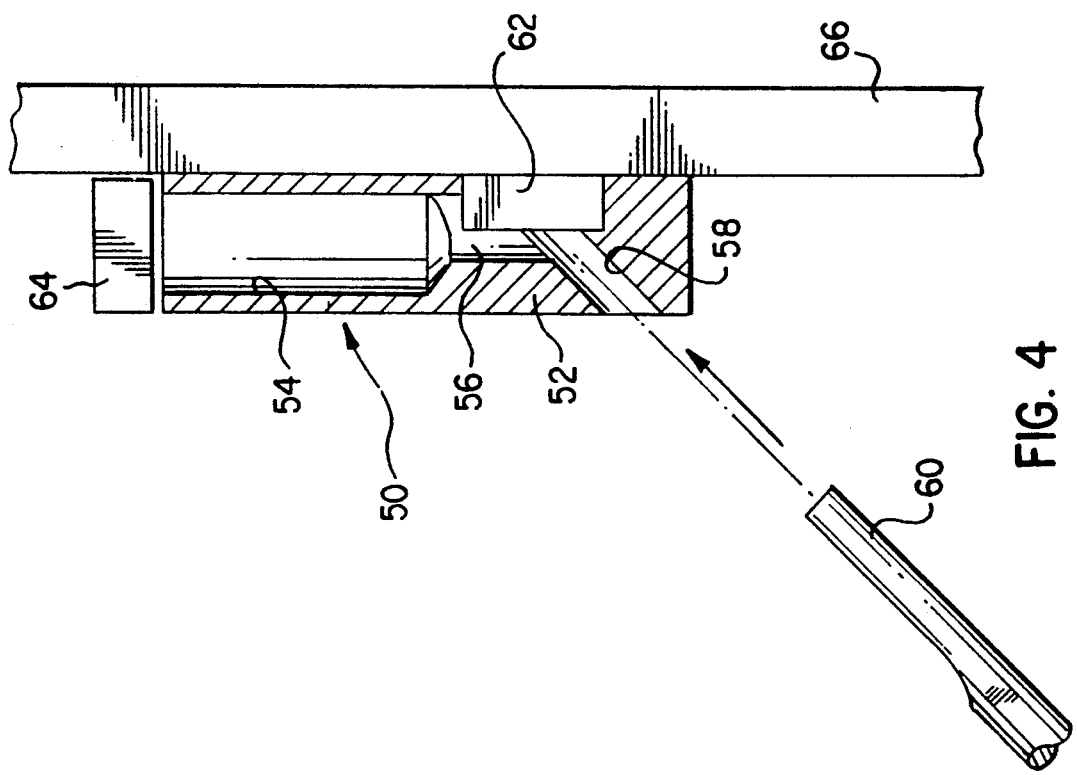

FIXTURE FOR, AND METHOD OF, WELDING GROUNDING CONNECTOR TO STRUCTURAL STEEL MEMBER

FIELD OF THE INVENTION

The invention relates to a fixture for welding a grounding connector to a steel member, and the method of using such fixture to perform such welding operation.

DESCRIPTION OF THE PRIOR ART

Relatively expensive molds have previously been used to weld grounding cables to structural steel elements. Such molds have employed complex mechanical clamping mechanisms to engage the structural steel member, and to position the mold thereon. The molds are used several times, in order to reduce the cost per molding operation. Difficulty may be encountered in positioning, and then clamping the mold in position. Similarly, after the welding operation has been completed, difficulty is encountered in removing the mold from the area of the welded joint formed between the grounding cables and the flat steel surface to which it is bonded. Such molds are available from Erico Products, Inc., Cleveland (Solon), Ohio 44139.

SUMMARY OF THE INVENTION

The present invention provides an inexpensive, single use, fixture that welds a grounding connector to a structural steel member. The fixture is formed of a magnetic material that is attracted to, and retained upon, the structural steel member, thus obviating the need for mechanical clamping systems used with conventional molds used for similar purposes.

The present invention includes a fixture including a body with an interior chamber adapted to receive thermite powder, and an igniter cap positioned above the chamber. Thermite powder is a mixture of aluminum powder and ion oxide, that, when ignited, evolves a great deal of heat, and is used in welding. An inlet passage extends angularly upwardly from the front face of the fixture, and one end of a grounding connector is inserted, and retained, therein. A rectangular outlet is defined in the rear face of the fixture. When the igniter cap is actuated to produce a spark, the thermite burns very rapidly and produces a molten metal mass that bonds the connector to the structural steel member. The fixture is also bonded in fixed position on the structural steel member. A grounding cable, or conductor, is secured to the connector to complete the connection.

The present invention contemplates a simple method of using the fixture to produce a connection that is reliable and long-lived. The resultant connection is equal, if not superior, to connections formed by known, multiple use molds with complex mechanical clamping systems.

BRIEF DESCRIPTION OF THE DRAWINGS

FIG. 4 is a side elevational view of an alternative embodiment of the fixture secured to the structural steel member, with a grounding stud being inserted therein; and FIG. 5 is a rear elevational view of the alternative embodiment of the fixture.

DETAILED DESCRIPTION OF THE PREFERRED EMBODIMENT

Figure 1:
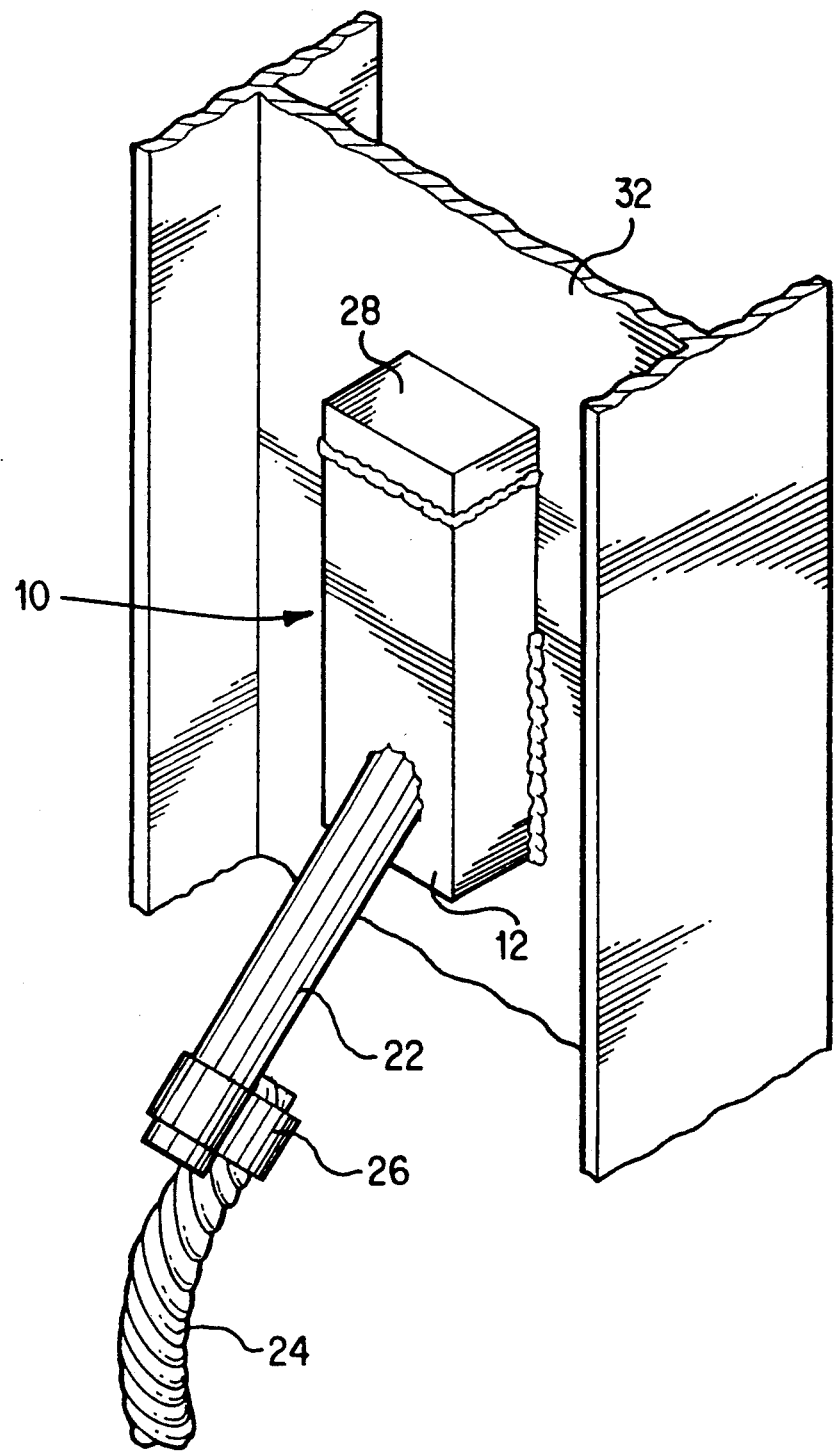
FIG. 1 is a perspective view of a preferred embodiment of a fixture constructed in accordance with the principles of the present invention, such fixture being used to weld a grounding stud to a structural steel member.
Figure 3:
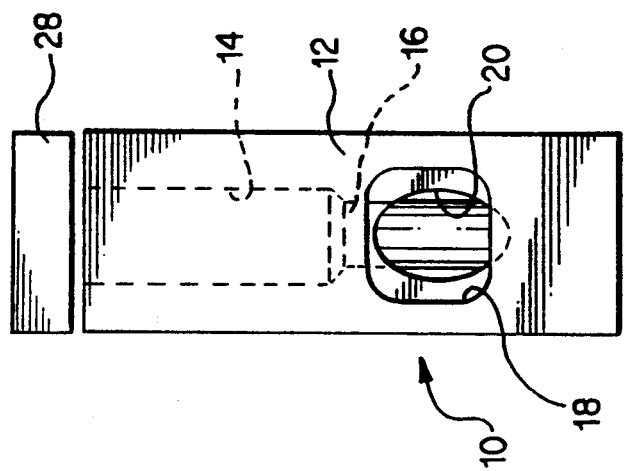
FIG. 3 is a rear elevational view of the preferred embodiment of the fixture.
Figure 2:
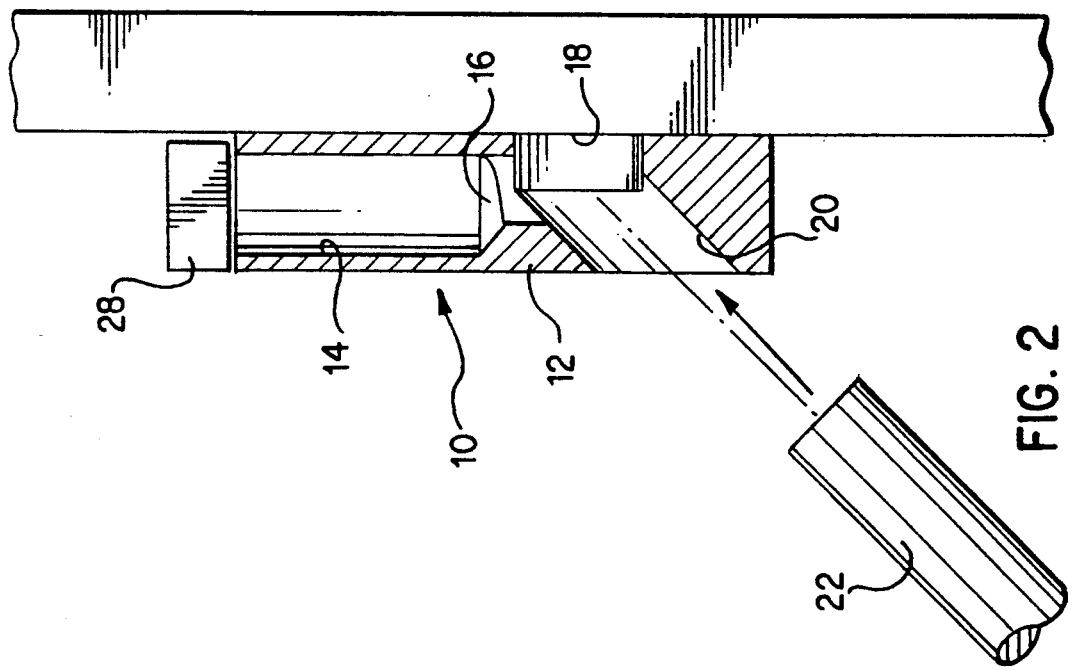
FIG. 2 is a side elevational view of the preferred embodiment of the fixture secured to the structural steel member, with a grounding stud being inserted therein.

Turning now to the drawings, FIGS. 1-3 depict a preferred embodiment of the fixture 10 constructed in accordance with the principles of the present invention. Fixture 10 comprises a generally rectangular block 12 formed of a magnetized steel material. A chamber 14 is formed within the body; such chamber opens outwardly at the upper end of the body, and tapers inwardly to terminate in channel 16 at its lower end. Channel 16 communications with rectangular outlet 18, that opens through the rear face of block 12.

An angularly oriented, tubular inlet passage 20 extends inwardly, and upwardly, from the front face of fixture 10. As indicated by the directional arrow shown in FIG. 2, the leading end of a grounding stud 22 is inserted into the passage 20. The leading end establishes communication with channel 16, when fully inserted. The overall configuration of grounding stud 22 is shown in FIG. 1, while only a fragment of grounding stud 22 is visible in FIG. 2. One grounding stud that is well suited for use with fixture 10 is identified as the "G-stud", and is sold by the Burndy Corporation of Norwalk, Conn.

A grounding conductor 24 is secured to the trailing end of stud 22 by a compression ring 26. The compression ring is crimped radially by conventional crimping tools, to mechanically, and electrically, join the grounding conductor to the grounding stud. A cap 28 covers the open, upper end of chamber 14 in fixture 10. The cap also functions as a spark generator, for welding powders introduced into chamber 14.

Block 12 of fixture 10 is formed of a magnetic steel material; such material enables fixture 10 to be affixed to the web 30 of a structural steel member, such as an I-beam 32. Only a fragment of beam 32 is shown in FIG. 1. The magnetized steel body insures that the fixture will be retained, in fixed position, upon beam 32 without resort to mechanical clamping mechanisms.

The method of utilizing fixture 10, to establish a secure connection between grounding cable 24 and beam 32, via grounding stud 22, is relatively simple to execute, yet efficient in operation. As the first step, block 12 is positioned upon I-beam 32, at a desired location; the block is retained in fixed position because of the magnetic attraction between the block and the beam. Then, the leading end of conductor 22 is inserted into inlet passage 20 in block 12. The conductor is retained in position because of an interference fit between the conductor cable and the inlet passage; the magnetized body may also attract the grounding stud.

Thermite welding powder is then introduced into the upper end of chamber 14 and flows downwardly through channel 16 to surround the leading end of conductor 22. Cap 28 is then positioned atop the open end of chamber 14, and is then struck, twisted, or otherwise mechanically manipulated, to produce a spark. The spark causes the powder to burn fiercely, and produce an exothermic reaction that bonds the leading end of conductor 22 to block 12, which, in turn, is secured, magnetically, to beam 32. Fixture 10 is also bonded to beam 32 by the flow of molten metal exiting through rectangular outlet 18. The molten metal that effectuates these permanent bonds is visible in FIG. 1, along the perimeter of block 12 adjacent to beam 32.

ALTERNATIVE EMBODIMENT

FIGS. 4 and 5 depict an alternative embodiment of a fixture constructed in accordance with the principles of the present invention. Fixture 50 comprises a generally rectangular block 52 formed of a magnetized steel material. A chamber 54 is formed within the body; such chamber opens outwardly at the upper end of the body, and tapers inwardly to terminate in channel 56 at its lower end.

An angularly oriented inlet passage 58 extends inwardly, and upwardly, from the front face of fixture 50. While passage 20 in fixture 10 is configured to receive a grounding stud of cylindrical shape, passage 58 is configured to receive the leading end, or tongue 60 of a conventional tongue connector. Tongue 60, when fully inserted, establishes communication with channel 56. The directional arrow in FIG. 4 suggests the path of movement of tongue 60 within fixture 50.

A rectangular outlet 62 opens outwardly through the rear of fixture 50; the outlet communicates with channel 56. A cap 64 covers the open, upper end of chamber 54; the cap is an igniter, and, when actuated, ignites the thermite powder introduced into chamber 54. The molten metal flows about tongue 60, positioned within inlet passage 58, and bonds the tongue connector to metal support member 66.

Other refinements, alterations, and modifications of fixtures 10 and 50 may occur to the skilled artisan. For example, while the rear surfaces of fixtures 10 and 50 are flat to fit snugly against I-beams, H-beams, or the like, such rear surface may be curved if the fixture is to be used to secure grounding connectors, tongue connectors, and the like, to curved surfaces such as pipes or tubular elements. Also, the structural steel elements might be replaced with steel components. The inlet passage in fixtures 10 and 50 may be configured to received, and retain, a variety of shapes, and sizes, of connectors. Consequently, the appended claims should be liberally construed in a manner consistent with the spirit of the invention, and should not be construed in accordance with their literal terms.

I claim:

1. A fixture for forming a connection between a connector and a structural steel member, said fixture comprising:
    a) a body having a front wall, a rear wall, a pair of spaced side walls, a top wall, and a bottom wall,
    b) said body having a chamber formed therein,
    c) said chamber opening upwardly through said top wall,
    d) said chamber terminating in a channel at its lower end,
    e) said body having an inlet passage extending inwardly, and upwardly, from the front wall of the body,
    f) an outlet defined through said rear wall of said body to communicate with said channel,
    g) a connector retained with said inlet passage in communication with said channel and said outlet,
    h) magnetic means for securing said fixture to said structural steel member,
    i) an ignitable substance introduced into said chamber, and
    j) an igniter cap positioned over the open upper end of said chamber for providing a spark to said ignitable substance which produces a molten metal mass that flows through said channel and said outlet to bond said fixture and said connector to said structural steel member.

2. A fixture as defined in claim 1 wherein said body is rectangular in shape and is formed of a magnetic material that is attracted to said structural steel member.

3. A fixture as defined in claim 1 wherein said ignitable substance is thermite powder.

4. A method of using a fixture to form a connection between a connector and a structural steel member, said fixture having a chamber formed therein, the method comprising the steps of:
    a) adhering said fixture to said structural steel member by magnetic attraction,
    b) inserting a connector into the interior of said fixture until said connector establishes communication with said chamber,
    c) introducing thermite powder into said chamber,
    d) igniting said thermite powder to initiate an exothermic reaction that produces a molten metal mass, and
    e) permitting said mass to flow through said fixture to bond said connector and said fixture to said structural steel member.

5. The method of claim 4 further including the steps of positioning an actuator cap over said chamber, and then actuating said cap to produce a spark for igniting said thermite powder.

* * * * *